(12) United States Patent
McFadden et al.

(10) Patent No.: US 11,044,595 B2
(45) Date of Patent: Jun. 22, 2021

(54) FLIP PHONE WITH DIRECT ACCESS TO EMERGENCY SERVICE PROVIDERS

(71) Applicant: TBD Safety, LLC, Largo, FL (US)

(72) Inventors: Brian McFadden, Largo, FL (US); Timothy Cabrera, Hobie Sound, FL (US); Hing-Tack Chen, Fresh Meadows, NY (US); David Tropper, Jamaica, NY (US)

( * ) Notice: Subject to any disclaimer, the term of this patent is extended or adjusted under 35 U.S.C. 154(b) by 0 days.

(21) Appl. No.: 16/596,221

(22) Filed: Oct. 8, 2019

(65) Prior Publication Data

US 2020/0252779 A1 Aug. 6, 2020

Related U.S. Application Data

(60) Continuation of application No. 16/269,388, filed on Feb. 6, 2019, which is a continuation of application No. 16/034,081, filed on Jul. 12, 2018, now abandoned, application No. 16/596,221, which is a continuation-in-part of application No. 15/801,907, filed on Nov. 2, 2017, now Pat. No. 10,440,548, said application No. 16/034,081 is a continuation of (Continued)

(51) Int. Cl.
| | |
|---|---|
| *H04W 4/90* | (2018.01) |
| *H04M 1/675* | (2006.01) |
| *H04M 1/2745* | (2020.01) |
| *H04M 1/72412* | (2021.01) |
| *H04M 1/72418* | (2021.01) |
| *H04M 1/72457* | (2021.01) |

(52) U.S. Cl.
CPC ............ *H04W 4/90* (2018.02); *H04M 1/2745* (2013.01); *H04M 1/675* (2013.01); *H04M 1/72412* (2021.01); *H04M 1/72418* (2021.01); *H04M 1/72457* (2021.01)

(58) Field of Classification Search
CPC ....... H04W 4/90; H04L 12/66; H04M 3/5116; H04M 1/72412; H04M 1/72418; H04M 1/675
See application file for complete search history.

(56) References Cited

U.S. PATENT DOCUMENTS

| | | | |
|---|---|---|---|
| 7,991,381 B1* | 8/2011 | Dunne .................... | H04L 12/66 455/404.1 |
| 2006/0073838 A1* | 4/2006 | Kamali ................. | A61B 5/411 455/456.1 |

(Continued)

*Primary Examiner* — Myron Wyche
(74) *Attorney, Agent, or Firm* — Royal W. Craig; Gordon Feinblatt LLC

(57) ABSTRACT

A method and apparatus of communication via a hand held device that includes receiving an indication at the device to initiate an emergency call via a wireless network; determining whether the device is configured with a subscriber identity module (SIM) card, wherein the SIM card includes a plurality of numbers; and sequentially calling the plurality of numbers stored on the SIM card based on the determination that the device is configured with the SIM card. Further, the method and apparatus include detecting an emergency indication; connecting to a wireless network; and establishing a communication with one or more emergency service providers based at least in part on detecting the emergency indication, wherein the communication is established via the wireless network.

19 Claims, 6 Drawing Sheets

Related U.S. Application Data application No. 15/608,252, filed on May 30, 2017, now abandoned, which is a continuation of application No. 15/148,779, filed on May 6, 2016, now Pat. No. 9,699,636, which is a division of application No. 14/563,366, filed on Dec. 8, 2014, now Pat. No. 9,402,173.

(60) Provisional application No. 62/416,580, filed on Nov. 2, 2016, provisional application No. 61/913,107, filed on Dec. 6, 2013.

(56) References Cited

U.S. PATENT DOCUMENTS

| | | | | |
|---|---|---|---|---|
| 2010/0003950 A1* | 1/2010 | Ray | ............... | H04M 3/5116 |
| | | | | 455/404.1 |
| 2010/0032276 A1* | 2/2010 | Arai | ............... | H01H 13/705 |
| | | | | 200/513 |
| 2010/0066672 A1* | 3/2010 | Schoolcraft | ............ | G06F 3/0317 |
| | | | | 345/158 |
| 2014/0335823 A1* | 11/2014 | Heredia | ............... | H04W 4/50 |
| | | | | 455/411 |

* cited by examiner step 1303

| COORDINATE CONVERSION | 2-WAY COMMUNICATIONS |
|---|---|
| GPS chip in cellular module 3 receives and sends latitude/longitude coordinates to GPS server 8 and as a web link of server 7, or email from server 7 or to a cell phone with a short message system | MPERS unit 20 creates a 2-way voice call to the 911 emergency service operator 10 |
| Mapping software at the GPS server 8 converts the latitude/longitude coordinates into an address format | |
| MPERS unit 20 reads the address and converts it into a voice file with conventional data to voice conversion software | During the call to 911, the user may press a "locate me" switch 2, which will announce its location onto the two way voice call between the user and 911 by activating the voice file. |
| | MPERS announces that the 911 operator can "press 9" to hear |

FIG. 8

FLIP PHONE WITH DIRECT ACCESS TO EMERGENCY SERVICE PROVIDERS

CROSS-REFERENCE TO RELATED APPLICATION(S)

The present application claims priority to U.S. application Ser. No. 15/801,907 filed 2 Nov. 2017, which in turn claims priority from provisional patent application No. 62/416,580 filed Nov. 2, 2016, and also claims priority to U.S. application Ser. No. 16/269,388 filed 6 Feb. 2019, which is a continuation of U.S. patent application Ser. No. 16/034,081, filed on Jul. 12, 2018, which is a continuation of U.S. patent application Ser. No. 15/608,252, filed on May 30, 2017, which is a continuation of U.S. patent application Ser. No. 15/148,779, filed on May 6, 2016, now U.S. Pat. No. 9,699,636 issued Jul. 4, 2017, which is a division of U.S. patent application Ser. No. 14/563,366, filed on Dec. 8, 2014, now U.S. Pat. No. 9,402,173 issued Jul. 26, 2016, which in turn claims priority to provisional Application No. 61/913,107 filed Dec. 6, 2013.

BACKGROUND OF THE INVENTION

1. Field of the Invention

The present invention relates to wireless (e.g., cellular) communication systems, and more particularly, systems for providing access to emergency service providers.

2. Description of the Background

Mobile telephony has become commonplace worldwide and the technologies and services that are available over mobile devices are proliferating. Mobile users are able to communicate with anyone in the world without the restrictions and limitations of cables or any fixed customer-side infrastructure. Mobile users have access to valuable public services such as the 911 telephone number for rapidly summoning emergency help. However, these services fall short in the case of a young child, a mentally incompetent or medically incapacitated person, someone lost in the woods, or the victim of an abduction or kidnapping. The 911 service cannot be subject to coverage and the quality of service issues, and must take precedence over telephony, video, data, messaging. The 911 service also cannot be dependent on a paid subscription for cellular services.

In the past such issues have necessitated a separate personal security system that can signal a 911-emergency situation without human intervention, and identify the individual's location. See, for example, U.S. Pat. No. 9,235,972. These mobile personal emergency response systems (mPERS) are not tethered to a land-line like traditional in-home devices. They operate on the same cellular signal that mobile phones do, offering mobility anywhere there is a cell signal. As another example Verizon™ Wireless will allow you to purchase a SureResponse device if you subscribe to a long term agreement. The subscription pays for monitoring by a central dispatch center, which provides monitoring support to confirm that an emergency exists before the central dispatch center calls a 911 emergency service operator to establish a call between the user and the 911 emergency service operator.

It would be desirable to integrate and mPERS device into a conventional cellular phone footprint and eliminate the central dispatch station from intervening between a person seeking emergency assistance and a 911 emergency service.

SUMMARY OF THE INVENTION

Accordingly, it is an object of the present invention to provide an improved mobile communication method and apparatus with conventional cellular telephone capabilities plus an independent 911 alert feature for detecting an emergency indication; connecting to a wireless (e.g., cellular) network; and establishing a priority communication with one or more emergency service providers based at least in part on detecting the emergency indication. The 911 alert feature is manually activated to initiate a priority call to a 911 emergency service operator directly to enable voice communication between the device and the 911 emergency service operation over a communication network and to emit a location information signal (actually a voice file) indicative of a location of the device, all in a manner that prevents termination of the call prior the location information signal being emitted. The device is configured to obtain location information by interfacing with an online location identification service such as Google Maps and/or from triangulation with cell tower servicer network devices based in part on signal strength.

The device may be configured with a subscriber identity module (SIM) card containing a user profile including a plurality of emergency contact numbers, and automatically sequentially calls the plurality of numbers stored on the SIM card based on the determination that the device is configured with the SIM card.

To the accomplishment of the foregoing and related ends, the one or more aspects comprise the features hereinafter fully described and particularly pointed out in the claims. The following description and the annexed drawings set forth in detail certain example features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 8 is a more detailed breakdown of step 1303 of FIG. 7.

DETAILED DESCRIPTION OF THE PREFERRED EMBODIMENTS

The present invention is an improved flip phone and method for providing a user thereof with direct access to emergency service providers by: detecting an emergency indication; connecting to a wireless (e.g., cellular) network; and establishing a communication with one or more emergency service providers on the wireless network in case of an emergency. The wireless flip phone has traditional cellular functionality and is additionally configured with a dedicated 911-emergency button that, when depressed, executes an emergency software module that overrides normal functionality, causes the wireless flip phone to immediately connect to the network and attempt to establish communication with an emergency service provider. Further, the wireless flip phone is configured such that upon depression of the 911-emergency button its current location may be determined through triangulation or other location method.

Figure 1:
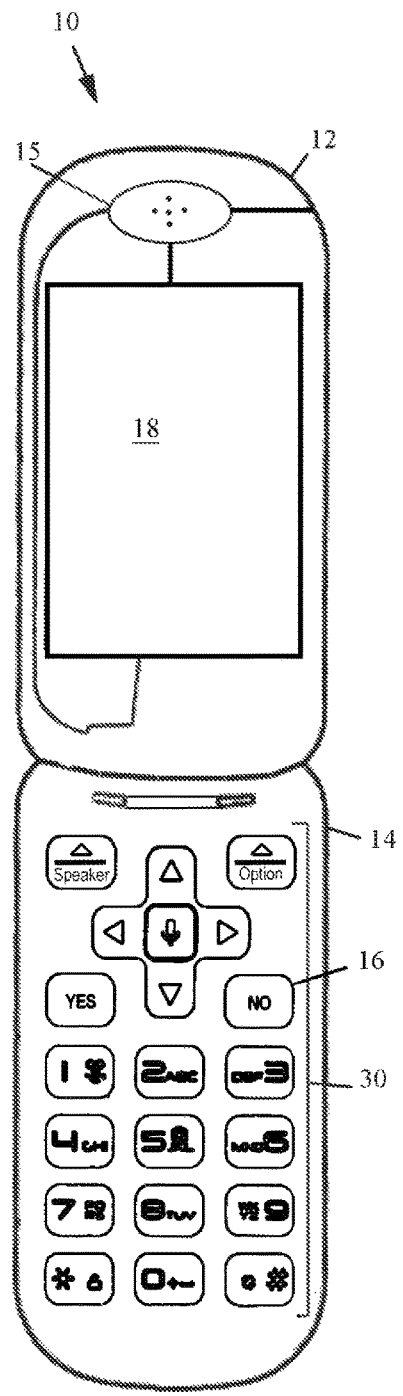
FIG. 1 is a front view of a wireless flip phone that may access one or more emergency service providers in accordance with aspects of the present invention.
Figure 2:
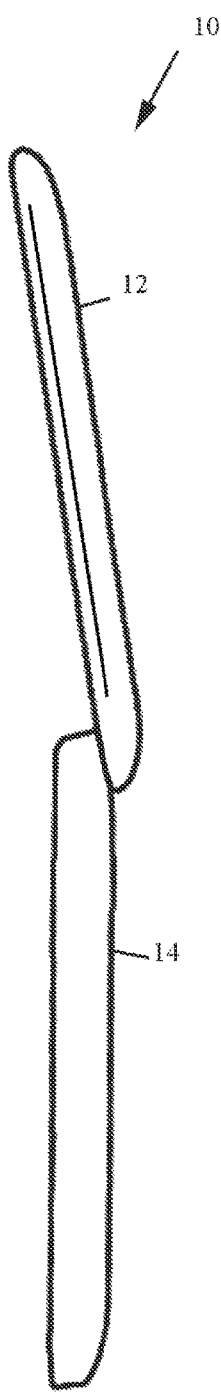
FIG. 2 is a side view of the wireless flip phone of FIG. 1.
Figure 3:
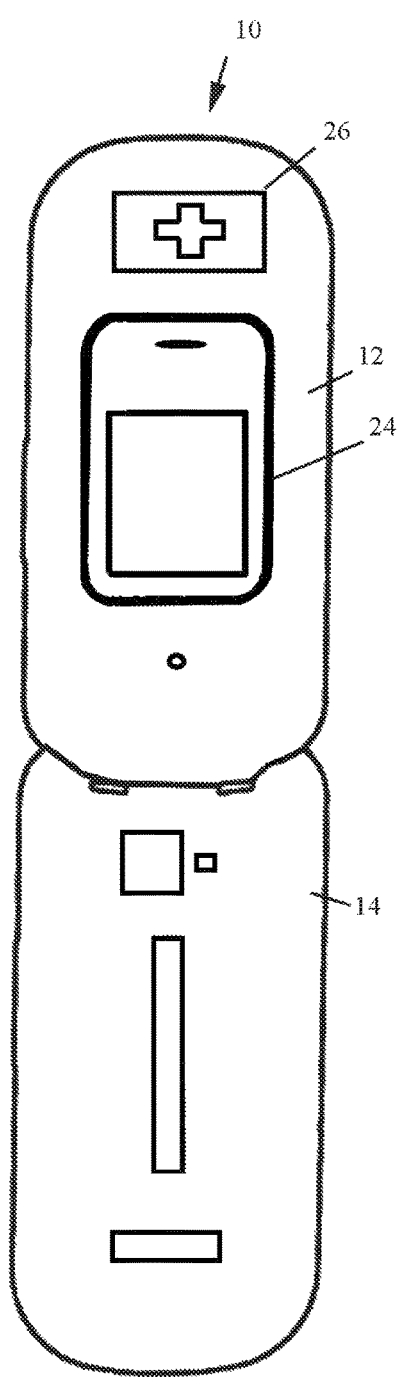
FIG. 3 is a rear view of the wireless flip phone of FIGS. 1-2.

Referring to FIGS. 1-3, in one aspect, a wireless flip phone 10 includes at least a two-part housing including upper housing 12 and lower housing 14 hinged together at one end. The upper housing 12 contains a speaker 15, display 18, and status indicator 24. The status indicator 24 comprises an LED-lit translucent rectangular inset around the rear of the upper housing 12 that glows to indicate charging in normal use. In addition, a 911-emergency button 26 is provided for one-button signaling of an emergency condition. When 911-emergency button 26 is depressed the status indicator 24 changes to a brightly-flashing strobe and speaker 15 emits a loud alarm to indicate said emergency condition to passersby, and so that first responders can more easily locate the site. The upper housing 12 also contains internal electronics (obscured) including a processor, memory, communications interface, a front and rear camera, and a GPS chip.

The lower housing 14 includes a battery compartment containing a 2000 mAh (Li-ion) battery and keypad 30. Keypad 30 includes a plurality of push-buttons 32 including a voice-assist button surrounded by navigational buttons.

In some instances, the wireless flip phone 10 may be configured, for example, with an approximate size of 72.5 millimeters (mm) by 47.5 mm by 1.9 mm. Moreover, the wireless flip phone 10 may be waterproof, and include a SIM card of approximate size of 25 mm by 15 mm under the battery compartment, for example.

In operation the wireless flip phone 10 may detect an emergency indication (e.g., received from a user); choose and connect to a wireless network; and establish direct communication over the wireless network with one or more emergency service providers. For instance, wireless flip phone 10 may communicate with a cellular communication network (e.g., see FIG. 4), preferably a 4G network, through one or more network entities when 911-emergency button 26 is depressed.

The 911-emergency button 26 is preferably a push button detent switch integrated in the upper housing 12 so as to be surface-mounted along with the internal electronics (obscured) and yet accessible through the upper housing 12. When 911-emergency button 26 is fully depressed the status indicator 24 changes to a brightly-flashing strobe and speaker 15 emits a loud alarm to indicate said emergency condition to passersby, and so that first responders can more easily locate the site.

Figure 4:
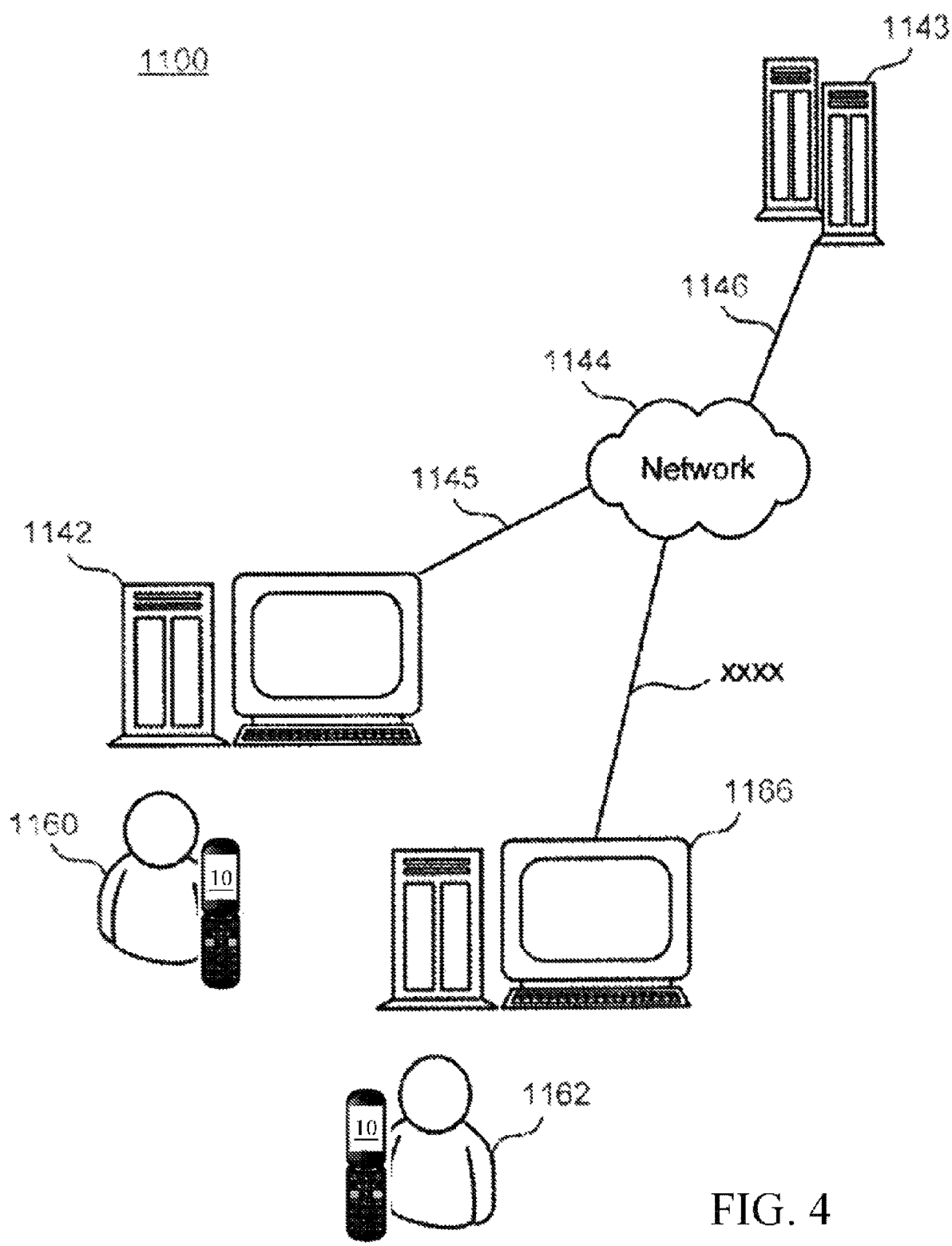
FIG. 4 is a representative diagram of an example computer system capable of carrying out functionality described in example implementations in accordance with aspects of the present invention.

FIG. 4 shows a communication network 1100 usable in accordance with the present invention. The communication system 1100 includes one or more users 1160, 1162 each using a flip phone 10, and one or more client terminals 1142, 1166 for remote user access and programming. Client terminals 1142, 1166 may be personal computers (PCs), mini-computers, mainframe computers, microcomputers, telephonic devices, or wireless devices, such as personal digital assistants ("PDAs"), smart phones, or other hand-held wireless devices (including, but not limited to the wireless communication device 10 of FIGS. 1-3). The flip phones 10 and client terminals 1142, 1166 are in communication with an application server 1143, such as a PC, minicomputer, mainframe computer, microcomputer, or other device having a processor and a repository for data and/or connection to a repository for data, via, for example, a network 1144, such as the Internet or an intranet, and couplings 1145, 1146, 1164. The couplings 1145, 1146, 1164 include, for example, wired, wireless, or fiber optic links.

In an embodiment wireless flip phone 10 is configured to detect that 911-emergency button 26 has been depressed for a threshold period of time (e.g., 3 seconds), e.g., button 26 is "intransiently-depressed"). This guards against inadvertent 911 calls. For example, the wireless flip phone 10 may be activated after 911-emergency button 26 is pressed for two seconds. As a result, wireless flip phone 10 may transmit a signal to one or more network entities to establish a connection to the network. Once the connection is established, wireless flip phone 10 may establish communication with one or more wireless service providers on the network, which may include establishing both voice and data communication between wireless flip phone 10 and the one or more wireless service providers. As a result, a user of wireless flip phone 10 may initiate a communication (e.g., call) with one or more operators at the one or more emergency service providers in order to resolve the emergency situation. In an optional aspect, microphone/speaker 15 may be configured to output voice announcements for connection status (e.g., dialing, failures, redial, stop dialing). In certain instances, the wireless flip phone 10 may connect with a 4G wireless network. Moreover, the wireless flip phone 10 may be configured with an International Mobile Station Equipment Identity number (IMEI) to identify device 10. In one example, the 911-emergency button 26 may be configured as a 1.5 centimeters (cm) rounded rectangular button 2 mm indented and with emergency cross icon indented at the front of the wireless flip phone 10.

In certain aspects, the wireless flip phone 10 may be configured to operate in a sleep mode if unused for a period or if the 911-emergency button 26 is not depressed (e.g., an emergency indication has not been received or when the wireless flip phone 10 is turned off). During sleep mode, wireless flip phone 10 may operate at a lower level of power consumption, for example. As such, wireless flip phone 10 may operate for an extended period of time (e.g., 100 days), subject to the number and duration of activations of an emergency indication. However, 911-emergency button 26 is configured to selectively power on wireless flip phone 10 when an intransient-depression signal is received while flip phone 10 is off or in sleep mode. In an aspect, wireless flip phone 10 may be configured to differentiate between the length of time the 911-emergency button 26 is depressed, and, based at least in part on the length of time of the depression; wireless flip phone 10 may turn on during the emergency indication.

In another aspect, wireless flip phone 10 may include no/cancel button 16 (FIG. 1), which may be configured to override a non-transient emergency indication and stop an attempt to establish communications with one or more emergency service providers. In another aspect, no/cancel button 16 may be configured to end an established communication with one or more emergency service providers. For example, wireless flip phone 10 may be configured to detect that no/cancel button 16 is depressed, and as a result, may stop an attempt to establish communication, or end the established communication. In an additional aspect, no/cancel button 16 may need to be depressed for a threshold period of time before wireless flip phone 10 responds.

Further, wireless flip phone 10 determines the current location of wireless flip phone 10. The current location is determined using augmented GPS (A-GPS) for minimal time-to-first-fix.

In some aspects, wireless flip phone 10 display 18 is configured to display text or graphic messages regarding the emergency call (e.g., status of the emergency call). Moreover, display 18 may display information regarding the current status of the device (e.g., battery level and/or device mode). In one variation, display 18 may, for example, be a liquid crystal display (LCD), a thin film transistor (TFT) active matrix display, a touch-sensitive screen, or other suitable display. Further, wireless flip phone 10 may include audio port and power charger port.

Status indicator 24, is configured to indicate normal operational status of wireless flip phone 10. For example, status indicator 24 may be or include a light emitting diode (LED) that turns green or red depending on battery status. In addition, status indicator 24 provides a visual alert when 911-emergency button 26 is depressed. In this case status indicator 24 flashes brightly to help summon emergency service providers. The flashing light source 24 helps to alert individuals in the immediate area that an emergency situation exists. In addition, once emergency response personnel have been summoned, the flashing light source 24 can help the emergency personnel locate the emergency phone 10 and, thus, the individual who summoned the assistance. Status indicator 24 may be configured to stop flashing when no/cancel button 16 is depressed.

Wireless flip phone 10, as described herein may also interchangeably be referred to as a mobile station, a subscriber station, a mobile unit, a subscriber unit, a wireless unit, a remote unit, a mobile device, a wireless (e.g. cellular) device, a wireless flip phone, a wireless terminal, a remote terminal, a handset, a terminal, a user agent, a mobile client, a client, or other suitable terminology.

Additionally, the network entity may be a macrocell, picocell, femtocell, access point, relay, Node B, mobile Node B, user equipment (UE) (e.g., communicating in peer-to-peer or ad-hoc mode with UE), or substantially any similar type of module that is able to communication with wireless flip phone 10 to provide wireless network access at the wireless flip phone 10.

Figure 5:
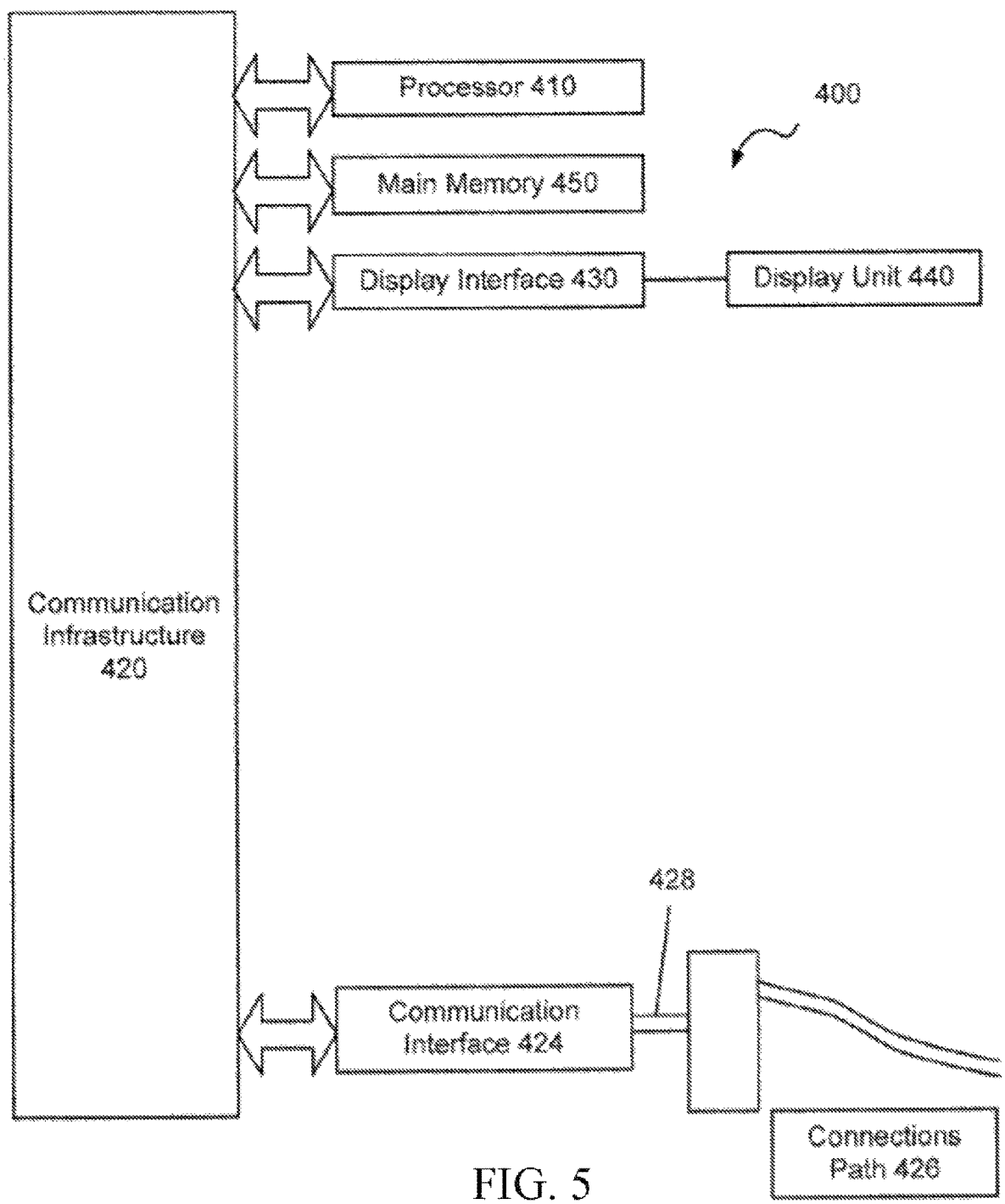
FIG. 5 is a block diagram of various example system modules, in accordance with an aspect of the present invention.

Internally, the flip phone 10 may be implemented using a hardware architecture and software combination capable of carrying out the functionality described herein. An example of such a hardware architecture 400 is shown in FIG. 5. Hardware architecture 400 includes a processor 410, for example, a Qualcomm™ MSM8909 quadcore processor with Bluetooth, Wifi and USB capability. The processor 410 is coupled to a communication infrastructure 420 (e.g., a communications bus and interfaces for Bluetooth/Wifi/USB).

Computer system 400 may include a display interface 430 that forwards graphics, text, and other data from the communication infrastructure 420 (or from a frame buffer not shown) to LCD display 18. Computer system 400 may include a main memory 450, preferably random access memory (RAM). Alternative aspects of the present invention may include secondary memory particularly for allowing computer programs or other instructions to be loaded into computer system 400. Such devices may include, for example, a removable memory chip (such as an erasable programmable read only memory (EPROM), or programmable read only memory (PROM) and associated socket, and other removable storage, which allow software and data to be transferred from the computer system 400. Signals 428 may be provided to communications interface 424 via a communications path (e.g., channel) 426.

Figure 6:
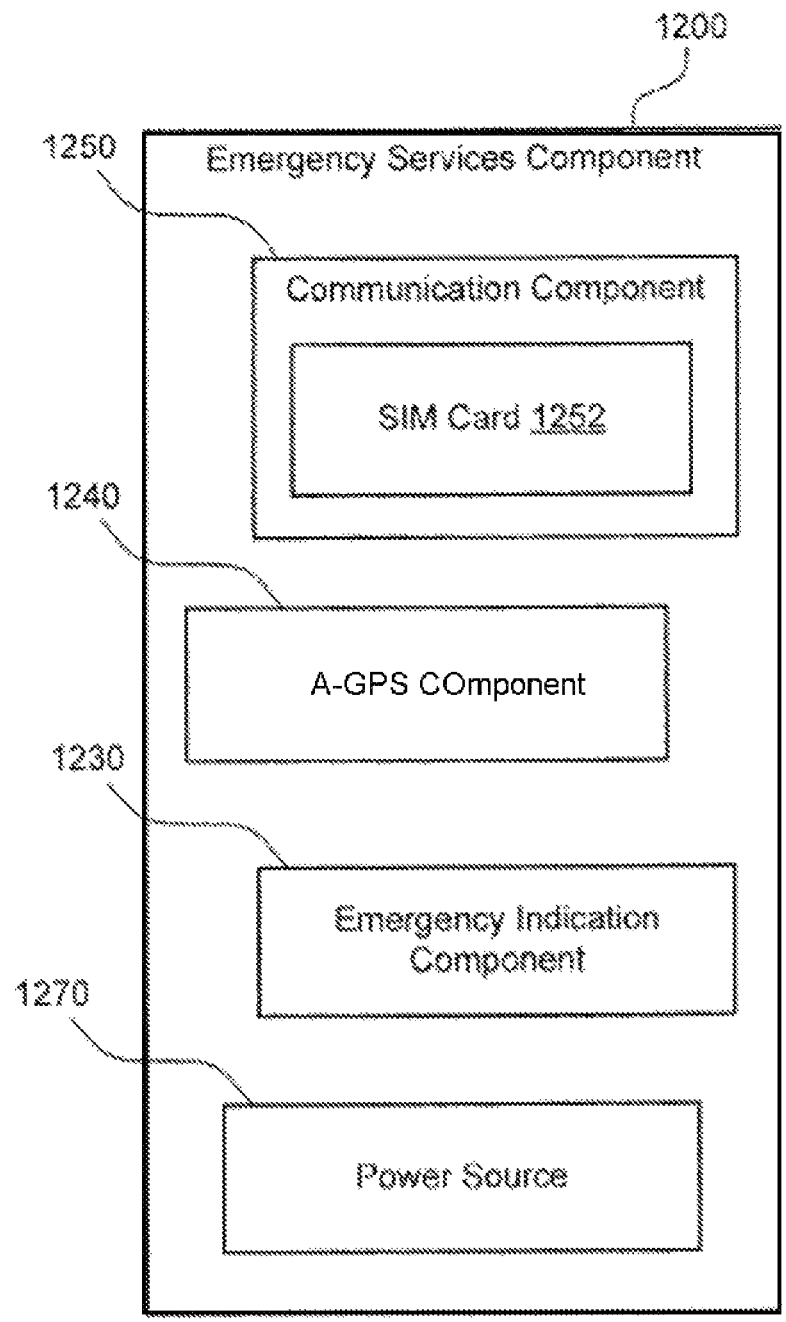
FIG. 6 is a diagram of emergency services module in accordance with an aspect of the present invention.

In accordance with an aspect of the invention, wireless flip phone 10 is configured with modular software stored on main memory 450 including an emergency service module 1200. FIG. 6 is a diagram of an emergency services module 1200 for use in accordance with an aspect of the present invention. The 911-emergency button 26 instantiates emergency services module 1200 which presents an emergency user interface 1260 on LCD display 18. Emergency services module 1200 also includes a dedicated communication module 1250, location services module 1240 and an emergency indication module 1230. In an aspect, communication module 1250 may be configured to manage communication exchange signaling to and from a network. Once the manually operative 911-emergency button 26 is moved into an activated position, the emergency services module 1200 overrides and shuts down all other cell phone functionality and calls on the communication module 1250, which transmits a signal via the cellular transmitter that will ultimately lead to establishing voice communication over a conventional communication network with a 911 emergency service operator at a 911 emergency service operator. That is, the call is made directly to the actual 911 emergency service operator as opposed to a call dispatch center that fields such calls to confirm that an emergency exists before performing the necessary steps to establish a call with the actual 911 emergency service operator. The call with the 911 emergency service operator is established directly through transmission of the signal over the conventional cellular communication network.

The communication module 1250 may include and execute communication protocols and/or manage other standards-specific communication procedures using protocol and/or standards-specific instructions and/or subscription-specific configuration information that allows communications with one or more network entities and/or networks.

A-GPS module 1240 is configured to determine the location of wireless flip phone 10 (FIG. 1) using A-GPS. For example, once a user depresses the 911-emergency button 26, wireless flip phone 10 and/or emergency services module 1200 may execute A-GPS module 1240 to initiate determination of the current location of wireless flip phone 10 from satellite GPS augmented by Wifi and cellular triangulation through one or more network entities.

Emergency indication module 1230 runs continuously as a background process and is configured to detect an emergency indication by intransient depression of 911-emergency button 26, disable normal cellular operations, and attempt to connect to one or more emergency service providers. The depression of the mechanical button directly initiates a call to 911 emergency service providers and overrides any additional program currently in process on the phone.

In another aspect, emergency services module 1200 may include an auxiliary or backup power source 1270 that may be configured to power the emergency service module 1200 during both sleep mode and when the emergency service module 1200 is engaged in communication. For example, power source 1270 may be stored in a battery compartment, such as lower housing 14 (FIG. 1), which may be configured to house one or more batteries of varying size and type. In one example, power source 1270 may include one or more backup Li-ion batteries. Further, power source 1270 may he detachable so as to allow for removal and replacement of the one or more batteries housed within the battery compartment. Alternatively, power source 1270 may provide for a built in battery that may be recharged via power charger port 22 (FIG. 1).

Figure 7:
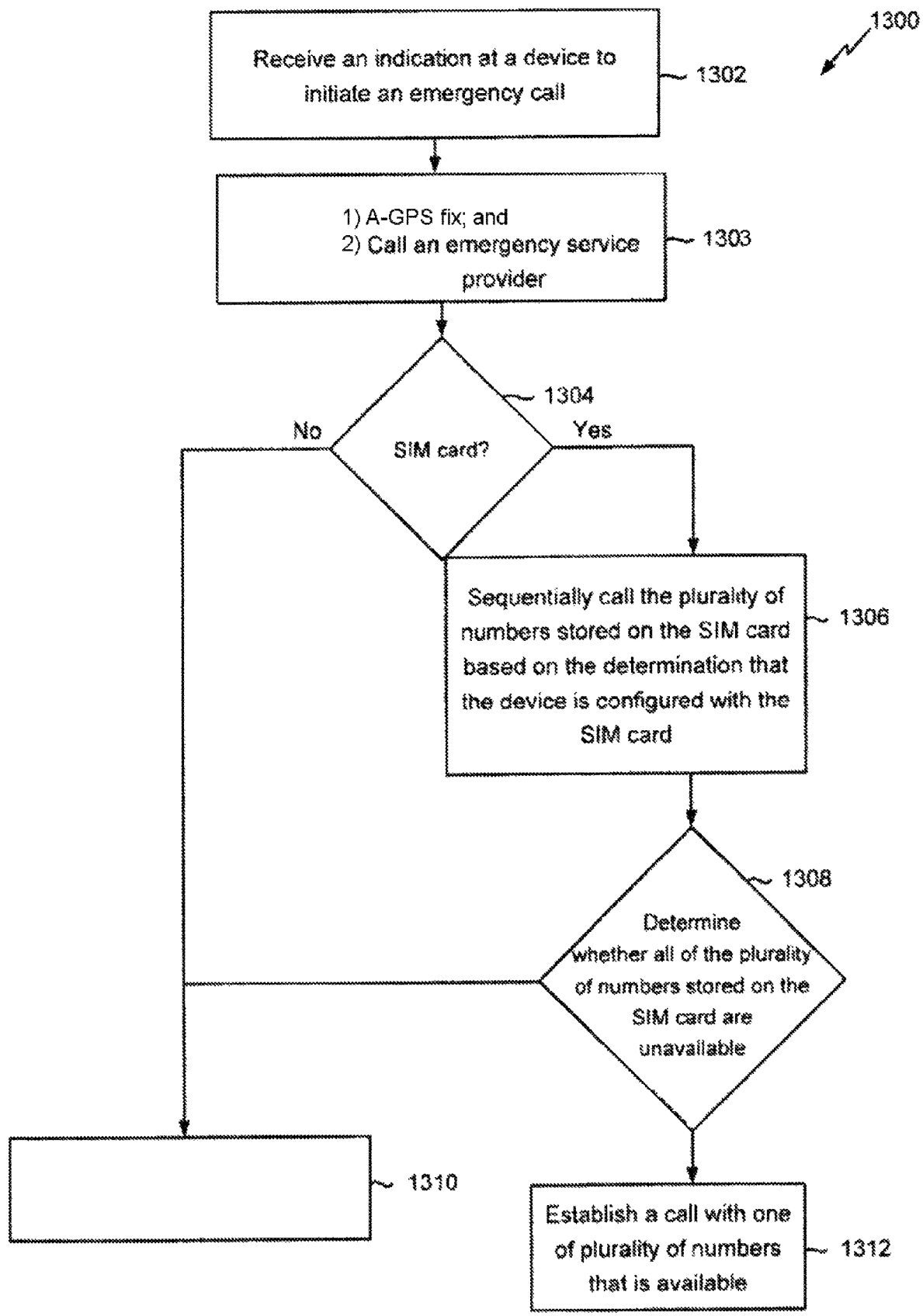
FIG. 7 is a flowchart of an example aspect of a method of communication in accordance with aspects of the present disclosure, such as is shown in FIG. 6.

Referring to FIG. 7, an example method is shown and described as a series of acts for purposes of simplicity of explanation. However, it is to be understood and appreciated that the example method (and further methods related thereto) are not limited by the order of acts, as some acts may, in accordance with one or more aspects, occur in different orders and/or concurrently with other acts from that shown and described herein. For example, it is to be appreciated that the methods may alternatively be represented as a series of interrelated states or events, such as in a state diagram. Moreover, not all illustrated acts may be required to implement a method in accordance with one or more features described herein.

In an example operational aspect, emergency indication module 1230 at step 1302 (FIG. 7) detects an emergency indication by intransient depression of 911-emergency button 26. At step 1303 (FIG. 7) emergency indication module 1230 initiates both the emergency services module 1200 and communication module 1250.

FIG. 8 is a more detailed breakdown of step 1303 of FIG. 7.

The A-GPS module 1240 initiates determination of the current location of wireless flip phone 10 from satellite GPS augmented by Wifi and cellular triangulation through one or more network entities. A-GPS augments satellite data with cell tower data to enhance quality and precision in poor satellite signal conditions. Using solely satellite data the device can take 5-10 minutes to provide a correct location. A-GPS relies on the cellular carrier's internet network connection. Thus, as soon as a user depresses the 911-emergency button 26, wireless flip phone 10 polls the on-board GPS chipset to capture a snapshot of the GPS signal, with approximate time. If necessary due to poor GPS signal, the GPS fix is supplemented by a Wi-Fi positioning system and cell-site multilateration. The resulting GPS data is automatically sent to the cellular carrier server to process into a position. The cellular carrier location server maintains accurate, surveyed coordinates for the cell site towers plus local knowledge of ionospheric conditions and other conditions affecting the GPS signal than the GPS receiver alone, enabling more precise calculation of position. In addition, the amount of processing and software required is offloaded to the cellular carrier server.

Also at step 1303 and simultaneous with the A-GPS fix the communications module 1250 initiates a direct emergency call via wireless network to a public emergency response center. The microprocessor 410 retrieves from main memory 450 a direct dial telephone number of the emergency response center that has been stored therein, e.g., "911". However, it should be appreciated that the invention is not limited to calling 911 centers. For example, the telephone number of a private emergency response service, instead of 911, could be stored in the memory 450. When the telephone number of the emergency response center has been retrieved from memory 450, the communication interface 424 transmits an outgoing cellular signal on a selected cellular channel and the indicator light 24 begins flashing.

At this point, the emergency response center answers the call from the flip phone 10 by transmitting a cellular signal referred to herein as an incoming cellular signal. The flip phone 10 receives the incoming cellular signal, and the in-use indicator light 24 turns green and remains constantly on to indicate to the user that communication with the emergency response center has been established. Preferably, the microphone and the speaker 15 are then enabled. The user may speak into the microphone to relay the nature of the emergency to the emergency response personnel.

The emergency indication module 1230 polls the A-GPS module 1240 for the GPS fix and plays a voice file to 911. Thus, the user is unable to terminate the call without the location announcement being played for the 911 operator to hear. In addition. the flip phone 10 is also programmed to send out the coordinates as a web link to a predetermined IP address associated with the cellular server or to an email address or to a cell phone as a short message service (SMS) message.

When the user wishes to terminate the call to the emergency response center, the user presses the 911-emergency button 26 for a second time, and holds the button 26 for a minimum period of time, such as three seconds. When the microprocessor 410 determines that the button 26 is pressed and held while the phone 10 is powered up, the microprocessor 410 causes the flip phone 10 to power down. Requiring that the button 26 be held down for a minimum time prevents accidental termination of the emergency call due to an inadvertent pressing of the button 26.

Next, the method automatically notifies others when a 911 emergency call has been placed from flip phone 10. For this the user preselects the people who she would like to be contacted in the case of an emergency and designates people to call and numbers. Those contacts are stored on the resident SIM card. The contact information (e.g., phone numbers and email address) for these notification contacts may be entered into an application resident on the phone.

Thus, after a 911 emergency call has been placed from flip phone 10, the emergency services module 1200 checks to see if a SIM card is inserted (e.g., block 1304).

At block 1308, method 1300 may determine whether all of the plurality of numbers stored on the SIM card are unavailable.

Note that all of the events that have occurred thus far in the calling process (steps 106-128) have been initiated by the press of the single activation button 20. Thus, once powered-on, the microprocessor 44 executes its preprogrammed instructions to automatically scan for an available channel, retrieve the telephone number, and place the cellular call without any further action on the part of the user.

Furthermore, emergency services module 1200 may reset the order of sequentially calling the plurality of numbers stored on the SIM card 1252, such as when the emergency services module 1200 is turned off, wherein resetting the order includes dialing a first number of the plurality of numbers first. For example, if emergency services module 1200 connects with a third number of the plurality of numbers after failing to connect with the first and second numbers and if the emergency services module 1200 is shut down, once the emergency services module 1200 turns on (e.g.; reset) it will dial the first number of the plurality of numbers when emergency indication module 1230 is activated.

At block 1312, method 1300 may establish a call with one of plurality of private numbers that are available. For example, as described herein, emergency services module 1200 (FIG. 5) may execute processor 410 and/or communication module 1250 (FIG. 5) to establish a call with one of plurality of numbers that is available. A pre-recorded voice message may be played informing relative of details.

Various aspects of a system in accordance with aspects of the present invention have been presented with references to a wireless communication system. As those skilled in the art will readily appreciate, various aspects described throughout this disclosure may be extended to other telecommunication systems, network architectures and communication standards. By way of example, various aspects may be extended to UMTS systems such as, TD-SCDMA, W-CDMA, High Speed Downlink Packet Access (HSDPA), High Speed Uplink. Packet Access (HSUPA), High Speed Packet Access Plus (HSPA+) and TD-CDMA. Various aspects may also be extended to systems employing Long Term Evolution (LTE), (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Having now fully set forth the preferred embodiments and certain modifications of the concept underlying the present invention, various other embodiments as well as certain variations and modifications of the embodiments herein shown and described will obviously occur to those skilled in the art upon becoming familiar with said underlying concept. It is to be understood, therefore, that the invention may be practiced otherwise than as specifically set forth in the appended claims.

We claim:

1. A method of communication, comprising:
    receiving an indication at a wireless device to initiate an emergency call, wherein said receiving step includes determining whether a 911-emergency button on the wireless device is depressed for at least a threshold period of time, wherein depressing the 911-emergency button for at least the threshold period of time causes the wireless device to power on and detect the emergency indication;
    determining whether the wireless device contains a subscriber identity module (SIM) card;
    outputting both an audible and a visual emergency indicator;
    determining that the SIM card contains a plurality of predetermined telephone numbers;
    disabling normal wireless communications operations, and
    establishing a communication with one or more emergency service providers based on the emergency indication, wherein establishing the communication with the one or more emergency service providers further comprises:
        initiating sequential calling of a predetermined plurality of numbers; and
        establishing a telephone connection to at least one of the predetermined plurality of numbers.

2. The method of claim 1, further comprising a step of outputting at least one of a voice prompt or a visual indicator corresponding to connection status.

3. The method of claim 1, wherein said at least one of the predetermined plurality of numbers comprises 911.

4. The method of claim 3, further comprising a step of outputting location to a 911 operator.

5. The method of communication of claim 1, wherein establishing a communication with one or more emergency service providers further comprises:
    initiating sequential calling of the plurality of numbers stored on the SIM card based on the determination that the device is configured with the SIM card;
    determining that all of the plurality of numbers stored on the SIM card are unavailable in response to sequentially calling of the plurality of numbers; and
    initiating a call with the one or more emergency service providers based on the determination that all of the plurality of numbers stored on the SIM card are unavailable.

6. The method of claim 5, further comprising:
    determining that all of the plurality of numbers stored on the SIM card are unavailable, and initiating a call of an emergency service provider.

7. An apparatus for communication, comprising:
    a clamshell housing having an upper housing section hinged to a lower housing section;
    a keypad and battery seated in the lower housing section, said keypad being exposed and manually accessible through an interior face of the lower housing section;
    a circuit board seated in the upper housing section, said circuit board including at least,
    a pushbutton detect switch mounted on one side of said circuit board,
    an emergency indicator light, both said pushbutton detent switch and emergency indicator light being exposed and manually accessible through an exterior face of the upper housing section when said clamshell housing is both open and closed,
    a memory storing executable instructions and mounted on an opposing side of said circuit board, and
    a processor mounted on an opposing side of said circuit board and in communication with the memory, wherein the processor is configured to execute the instructions to:
        detect an emergency indication, wherein the processor configured to detect the emergency indication is further configured to determine whether a 911-emergency button is depressed for at least a threshold period of time, wherein depressing the 911-emergency button for at least the threshold period of time causes the process or to either power on or off the apparatus or detect the emergency indication;
        activate said apparatus,
        disable normal communications operations,
    connect to a wireless network;
        output at least one of a voice prompt or a visual indicator corresponding to connection status; and
        establish a communication with one or more emergency service providers via the wireless network based at least in part on receiving the emergency indication, wherein establishing the communication with the one or more emergency service providers further includes:
    initiating a communication request to a remote device, via the wireless network; and
    after completing the initiation of the communication request to the remote device,
    initiating a call with the one or more emergency service providers.

8. The apparatus of claim 7, wherein establishing a communication with one or more service providers further comprises:
    determining that the device is configured with a subscriber identity module (SIM) card;
    determining that the SIM card includes a plurality of numbers, and
    wherein establishing a communication further comprises:
    initiating sequential calling of the plurality of numbers stored on the SIM card based on the determination that the device is configured with the SIM card;
    determining that all of the plurality of numbers stored on the SIM card are unavailable in response to sequentially calling of the plurality of numbers; and
    initiating a call with the one or more emergency service providers based on the determination that all of the plurality of numbers stored on the SIM card are unavailable.

9. The apparatus of claim 8, wherein initiating sequential calling of the plurality of numbers stored on the SIM card based on the determination that the device is configured with the SIM card further comprises:
    calling a first number of the plurality of numbers stored on the SIM card;
    determining that the first number is unavailable;
    calling a second number of the plurality of numbers stored on the SIM card based on the determination that the first number is unavailable; and
    determining that the second number is unavailable, and sequentially calling each of the remaining umbers of the plurality of numbers based on the determination that a previously called number is unavailable.

10. The apparatus of claim 9, wherein the processor is further configured to execute instructions to initiate a call of an emergency service provider when all of the plurality of numbers stored on the SIM card are unavailable.

11. The apparatus of claim 9, wherein initiating a communication with a remote device includes:
    initiating a communication with a third party, at a remote location, via the wireless network.

12. The apparatus of claim 11 wherein initiating a communication with a third party, at a remote location, via the wireless network comprises initiating a 911 call.

13. The apparatus of claim 11, wherein the remote device comprises a server.

14. The apparatus of claim 12, wherein the processor is further configured to execute instructions to initiate a call of an emergency service provider when the device is not configured with the SIM card.

15. An apparatus for communication, comprising:
    a clamshell housing having an upper housing section hinged to a lower housing section;
    a keypad and battery seated in the lower housing section, said keypad being exposed and manually accessible through an interior face of the lower housing section;
    a circuit board seated in the upper housing section, said circuit board including at least,
        a pushbutton detent switch mounted on one side of said circuit board,
        an emergency indicator light mounted on said one side of said circuit board, both said pushbutton detent switch and emergency indicator light being exposed and manually accessible through an exterior face of the upper housing section when said clamshell housing is both open and closed,
        a memory storing executable instructions mounted on an opposing side of said circuit board,
        a processor mounted on said opposing side of said circuit hoard in communication with the memory and pushbutton detent switch, wherein the processor is configured to execute the instructions to,
            activate said apparatus,
            detect when said pushbutton detent switch is depressed for at least a threshold period of time,
            disable normal communications operations,
    connecting to a wireless network, and
        establish a communication session with an emergency service provider via the wireless network.

16. The apparatus of claim 15, wherein said push button detent switch is surface-mounted adjacent the processor on said circuit board.

17. The apparatus of 15, wherein said emergency indicator light comprises a flashing LED status indicator.

18. The apparatus of claim 15, further comprising an emergency alarm siren.

19. The apparatus of claim 15, wherein said processor is configured with software comprising computer instructions to disable normal communications operations by overriding all other functionality upon depression of said push button detent switch except for establishing a communication session with an emergency service provider via the wireless network.

* * * * *